US005587226A

United States Patent [19]

Leung et al.

[11] Patent Number: 5,587,226

[45] Date of Patent: Dec. 24, 1996

[54] PORCELAIN-COATED ANTENNA FOR RADIO-FREQUENCY DRIVEN PLASMA SOURCE

[75] Inventors: Ka-Ngo Leung, Hercules; Russell P. Wells, Kensington; Glen E. Craven, Fremont, all of Calif.

[73] Assignee: Regents, University of California, Oakland, Calif.

[21] Appl. No.: 10,108

[22] Filed: Jan. 28, 1993

[51] Int. Cl.[6] .......... B32B 9/00

[52] U.S. Cl. .......... 428/210; 428/432; 428/450; 428/467; 428/469

[58] Field of Search .......... 501/14; 427/117, 427/118, 120, 126.2, 126.3, 190, 193, 204, 205, 374.6, 374.7; 313/355; 428/210, 432, 450, 467, 469

[56] References Cited

U.S. PATENT DOCUMENTS

| | | | |
|---|---|---|---|
| 4,725,449 | 2/1988 | Ehlers et al. | 427/49 |
| 5,272,414 | 12/1993 | Iwanaga | 313/631 |

FOREIGN PATENT DOCUMENTS

| | | |
|---|---|---|
| 57-202644 | 12/1982 | Japan . |
| 58-22302 | 2/1983 | Japan . |
| 2217105 | 10/1989 | United Kingdom . |

OTHER PUBLICATIONS

Engineering Mat'ls Handbook vol. 4; Ceramics & Glasses.
Encyclopedia of Mat'l Science & Engineering vol. 5.
Mat'l Handbook 12th Edition.
Hackh's Chemical Dictionary 4th Edition.

*Primary Examiner*—Patrick Ryan
*Assistant Examiner*—Cathy K. Lam
*Attorney, Agent, or Firm*—Pepi Ross

[57] ABSTRACT

A new porcelain-enamel coated antenna creates a clean plasma for volume or surface-conversion ion sources. The porcelain-enamel coating is hard, electrically insulating, long lasting, non fragile, and resistant to puncture by high energy ions in the plasma. Plasma and ion production using the porcelain enamel coated antenna is uncontaminated with filament or extraneous metal ion because the porcelain does not evaporate and is not sputtered into the plasma during operation.

Ion beams produced using the new porcelain-enamel coated antenna are useful in ion implantation, high energy accelerators, negative, positive, or neutral beam applications, fusion, and treatment of chemical or radioactive waste for disposal. For ion implantation, the appropriate species ion beam generated with the inventive antenna will penetrate large or small, irregularly shaped conducting objects with a narrow implantation profile.

24 Claims, 3 Drawing Sheets

PORCELAIN-COATED ANTENNA FOR RADIO-FREQUENCY DRIVEN PLASMA SOURCE

This invention was made with U.S. Government support under Contract No. DE-AC03-76SF00098 between the U.S. Department of Energy and the University of California for the operation of Lawrence Berkeley Laboratory. The U.S. Government has certain rights in this invention.

BACKGROUND OF THE INVENTION

1. Field of the Invention

This invention relates to a new improved ion and plasma source antenna. Ion sources are used in ion beam and neutral beam accelerators, spectrometers, for ion implantation, waste control of radioactive nuclear materials, and in plasma processing. Plasma processing encompasses the use of plasmas for surface treatment or surface modification including but not limited to ion implantation or coating of surfaces. Ion beams may also be useful for fusion. The positive or negative ions are generally obtained or extracted from a plasma that is created from a low pressure gas in a vacuum chamber. The gas is ionized by electron bombardment, vacuum arc discharge, thermal filaments, or power coupled from a power source to the gas via an antenna. This invention relates to a new improved radio frequency driven antenna used to create a plasma from which ions are extracted.

2. The Prior Art

Generally an ion source comprises a vacuum chamber into which a gas is introduced. The gas is ionized into a plasma through electron bombardment, vacuum arc discharge, or microwave or radio frequency (RF) power that is coupled to the gas volume by an antenna [The Physics and Technology of Ion Sources, Ian G. Brown, ed.; John Wiley & Sons (NY: 1989)].

One common method of producing a high density plasma in an ion source is to provide thermionic cathode filaments which emit a copious supply of electrons, which then may be accelerated to produce an ionized gas plasma. This approach has the disadvantage that thermionic cathode filaments often have a very short operating life of only a few hours, for example. Moreover, the electrically heated filaments produce considerable radiative heat which may cause operating problems such as material evaporating from the filament, or material being sputtered from the filament. The filament material that boils off or is sputtered off is a unwanted source of impurities in the plasma.

Another method of producing a dense ionized gas plasma is to supply RF power to the vacuum space. Sometimes a small thermionic cathode filament or other type of ionization starter is provided to emit electrons so that there is initial ionization of the ionizable gas. The RF power then provides additional energy so that a dense ionized gas plasma is produced. The RF power can be thought of as heating or increasing the energy level of the ionized gas so that a dense plasma is produced.

The power is supplied to the ion source by an antenna in the vacuum chamber. The antenna coil has power lead-ins which extend through seals in the walls of the vacuum chamber and are connected to an amplifier or an oscillator, outside the vacuum chamber. The power frequency is in the range of one to hundreds of megahertz.

The antenna often takes the form of an elongated electrical conductor formed into a coil.

Frequently, the antenna coil may be made of copper tubing.

Problems have been encountered with such antenna coils. When the antenna coil is made of bare metal, such as copper, sparking or arcing may occur in the vacuum chamber, both between the turns of the coil, and also between the coil and various electrodes which may be employed in the ion source. When the antenna coil is operated at high power levels, the RF voltage between different portions of the coil may be quite high. Moreover, electrodes may be employed in the ion source to produce accelerating voltages which are quite high, so that sparking or arcing may occur.

When a bare antenna coil is employed in an ion source, problems are often encountered with sputtering of the copper or other metal from the antenna coil, due to ion bombardment of the antenna coil. The sputtered copper or other metal is deposited on other surfaces within the vacuum chamber of the ion source and may cause problems such as current leakage or short circuits between electrodes.

An attempt has been made to deal with these problems of voltage breakdown, sparking, arcing and sputtering by covering the bare antenna coil with sleeving material made of woven glass, quartz fibers, or ceramic to act as electrical insulation. This approach reduces sputtering but does not eliminate sputtering as a problem. Moreover, the woven glass or quartz sleeving provides only limited protection against voltage breakdown, sparking and arcing, without eliminating them as problems. With the ceramic tubing, the electric field is attenuated too much for good power application to the gas volume via the antenna.

Sleeving does not make good thermal contact with antenna which results in problems with overheating. Moreover, the woven glass or quartz sheathing introduces the additional problem of causing the evolution of contaminating gases, such as oxygen and water vapor, which are driven out of the woven glass or quartz material during the operation of the ion source, largely due to the heat generated in the ion source during normal operation.

In 1988 researchers developed a glass-coated copper-coil antenna on which the glass coating was fused directly on to a copper antenna (U.S. Pat. No. 4,725,449, Ehlers & Leung). It had several advantages over previous RF coupled antennas. Glass is electrically insulating and allows the exterior of the antenna to float at a lower negative potential than that applied to the antenna. This reduced the sputtering of antenna material by the surrounding plasma ions. The glass coating is flexible enough that it doesn't crack from vibration during operation and the coefficient of thermal expansion of the glass coating is sufficiently close to copper's to resist some thermal stress. However, the glass coating is very fragile, frequently becomes porous, and is not as good an electrical insulator as would be desirable. It's performance deteriorates in the presence of corrosive gasses. It is limited to a power of 25 kilowatts. High energy electrons appear to pierce the glass wall and destroy the electrically insulating quality of the coating. This happens more quickly at high power operation than at low power operation. It also exhibits a limited lifetime at lower power operation because there is always some distribution of particles present with high energy, even in a low energy plasma. Practically, the glass coating is not an effective electrical insulator at powers above about 25–30 kW.

It would be extremely desirable if an antenna could be constructed with a coating material that had greater mechanical strength and higher dielectric constant than those currently available while maintaining good thermal contact with the exterior of the antenna. It would be even more desirable to construct an antenna capable of coupling more than about 25 kilowatts power to the plasma. It would be yet more desirable to have an antenna that would last longer than the fragile glass-coated antenna. It would be most desirable if an antenna was available that resisted the corrosive effects of many plasma gasses, for example, $BF_3$. It would be even more desirable to be able to produce an antenna coated with a thin layer of very dense, hard, mechanically stable, slightly flexible, nonconducting material that fused directly to the antenna metal.

SUMMARY OF THE INVENTION

The present invention is a new and improved power transmission antenna and the method for making it. The antenna of the invention comprises a metal conductor which has a high-density electrically-insulating porcelain coating bonded to its exterior surface, and a means of connecting the porcelain coated antenna to an impedance-matched power supply.

The porcelain coating is formed from a mixture, referred to in the trade as a "porcelain slip", comprising, frit, clay, setting agent, bisque strength agent, mixture suspension agent, water, viscosity agent, optionally disinfectant, and optionally pigment. The antenna of the invention is made by a process which involves coiling the metal conductor, cleaning the metal conductor, preferably etching the metal conductor, rinsing the metal conductor, preferably removing oxides from the surface of the metal conductor, applying a thin coat of the porcelain slip to the metal conductor, and firing the coated metal conductor at a temperature high enough to form a porcelain coating on the surface thereof, but low enough to not distort the form of the metal conductor by melting it, and applying repeated coats of porcelain slip and firing each coat until the enamel coating is electrically insulating.

The porcelain coating performs better than glass coating. The porcelain coating is slightly flexible and is therefore resistant to cracking and can survive some mechanical impacts. The present invention therefore has a much longer life time, including but not limited to longer shelf life, more operating hours, and vibration survival (so, among other advantages associated with vibration survival, it can be transported without breaking), than other antennas. The porcelain is very dense and therefore makes a better electrical insulator than glass. It appears to resist penetration by high energy particles and operates for long periods of time, in high or low energy plasmas, without loss of its electrically insulating quality. This feature may be due to the fact that the porcelain forms a less porous coating than glass does. The porcelain coated antenna of this invention provides better electrical insulation than glass-coated antennas and thus allows use of higher electrical fields and couples higher power to its surroundings than existing antennas. The porcelain coated antenna of this invention is resistant to corrosion. Because the porcelain is bonded directly to the metal antenna, thermal coupling to the water cooled antenna is very high and the entire antenna and can be held at a constant temperature for continuous operation. The cooled antenna further protects the sealant from becoming hot enough to degrade where the antenna is attached to the source. A yet further advantage of the porcelain coated antenna is that the melting temperature of porcelain is higher than the melting temperature of glass so that the inventive antenna can be used in hotter plasmas than the glass coated antenna.

There are also several advantages to using the inventive porcelain-coated antenna as an RF-driven antenna to create plasma ion sources over use of DC filament discharge to create plasma ion sources: (1) the RF discharge can be operated with all gases (including oxygen which can easily poison tungsten filament cathodes); (2) there are no short life components in the source; (3) a clean plasma, free from contamination from the cathode material, can be maintained; and (4) the RF power supplies operate conveniently at ground potential. These reasons, among others, make ion sources utilizing the inventive RF driven porcelain-coated antenna as an ion source very attractive for particle accelerators and for ion implantation applications.

The inventive, hard, electrically-insulating, corrosion resistant porcelain-enamel coated antenna is useful for inductive heating applications, for example to heat-treat or purify metals, or for brazing.

Other features and advantages of the invention will be apparent from the description of the preferred embodiments and from the claims. Some examples of the method of production and utility of the RF-driven porcelain-coated antenna are set forth below.

DETAILED DESCRIPTION OF THE INVENTION

Figure 1:
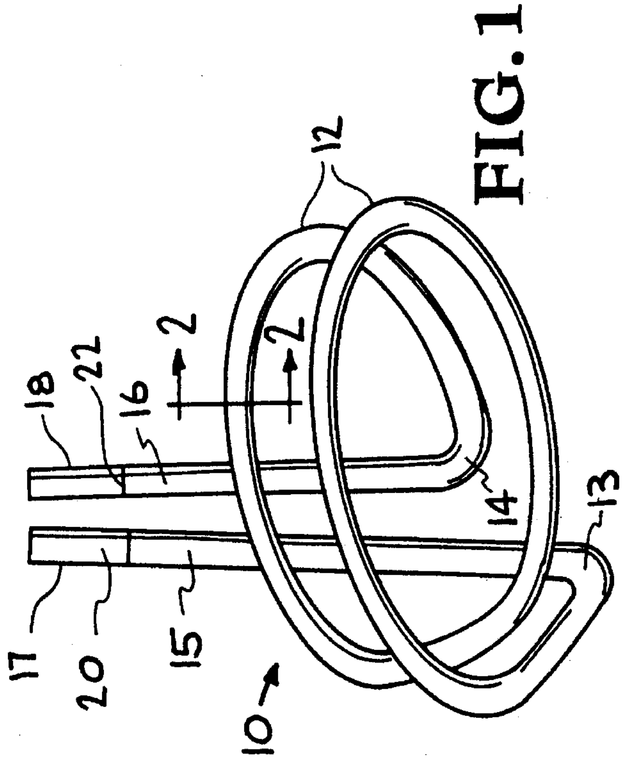
FIG. 1 is a somewhat diagrammatic perspective view showing a plasma ion source antenna to be described as an illustrative embodiment of the present invention.

FIG. 1 illustrates a plasma ion source antenna 10 having a continuous elongated porcelain coated conductor in the form of a coil 12 which in this case is helical in form but may assume various other forms. The coil 12 has end portions, bent from the coil, as at 13 and 14 and extending away from the coil to provide lead-ins 15 and 16 which may have uncoated portions 17 and 18 for use and electrical contacts.

For various applications, the plasma ion source antenna coil 12 may vary in diameter of the conductor, the number and spacing of the turns, and the diameter of the turns of the coil.

Figure 2:
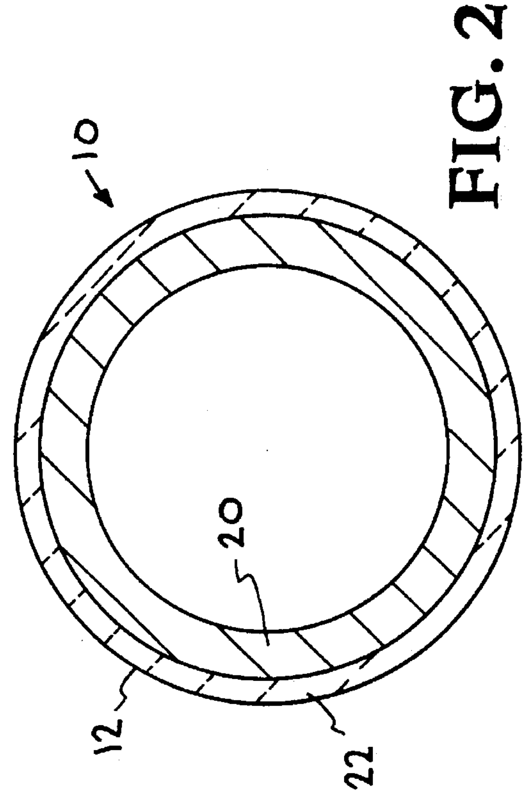
FIG. 2 is an enlarged sectional view, taken generally along the line 2—2 in FIG. 1.
Figure 3A:
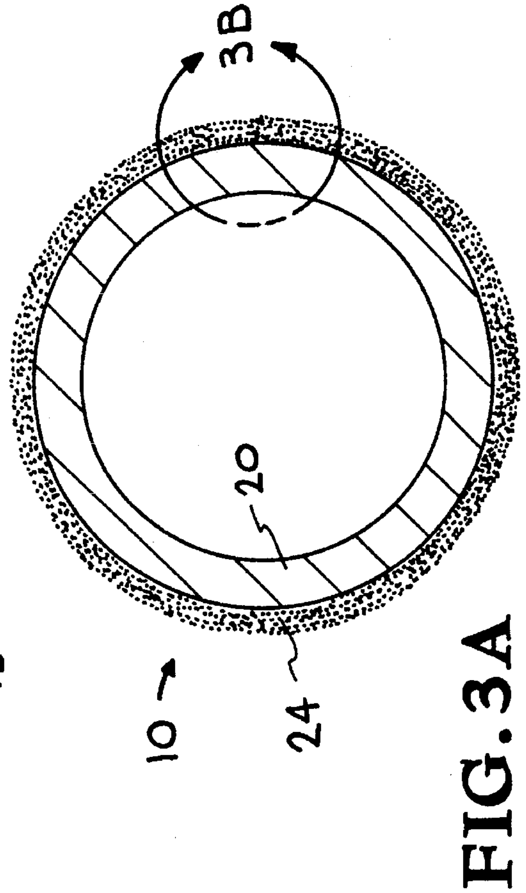
FIG. 3 is an enlarged cross section through the antenna, illustrating steps in a method of making the antenna, and specifically illustrating the coating of the metal conductor with one or more coatings of porcelain.
Figure 3B:
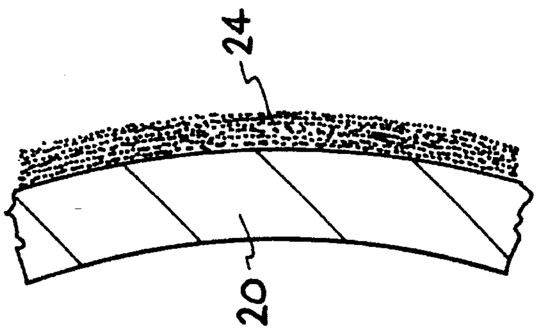

As shown in FIG. 2, the antenna is made, in part, of electrically conductive metal 20, which may be solid or may be tubing. The conductor 20 is preferably made of copper but may be made of other suitable metals. As shown, the conductor is tubing that is circular in cross section, but may assume other forms.

In accordance with the present invention, the metal conductor 20 of the plasma ion source antenna 10 is coated with one or more thin impervious layers or coatings 22 of porcelain which is fused to the conductor and is strongly adherent thereto. The porcelain coating(s) cover the entire surface of the conductor 20 including the coiled portion of the antenna 12, the bent portions 13 and 14, and the lead-ins 15 and 16. The lead-ins are preferably located exterior to the coil to avoid the hottest portion of the plasma. Terminal portions, however, may be uncoated, for convenience in providing electrical contacts 17 and 18. The porcelain coating 22 is thin, continuous, impervious, not susceptible to corrosion, and substantially uniform in thickness. It has been found that the optimum thickness of the porcelain coating is in the range of from 0.1 mm to 0.4 mm but can vary from 0.01 mm to 6 mm thick. For a given set of operating conditions, if the electrically insulating porcelain coating becomes too thick the antenna will not maintain a plasma. It can easily be determined by trial and error when the coating is too thick for a particular set of operating conditions or application.

The continuous, impervious, noncorrosive porcelain coating 22 is an excellent electrical insulator, even better than glass. It has been found to withstand an applied voltage of 20 kilovolts.

The continuous, impervious, noncorrosive porcelain coating 22 substantially prevents sputtering of metal from the antenna when immersed in a plasma. Moreover, the porcelain coating is not itself sputtered to any substantial extent. The excellent dielectric properties of the porcelain cause the exterior surface to float electrically at a potential that is approximately the same as, or close to, the potential of the surrounding ionized plasma. Thus, compared to a bare metal conductor, the porcelain coating 22 reduces the energy of any ions that may collide with it so that there is no substantial sputtering of the porcelain coating. To the extent that the porcelain coating is a better electrical insulator than glass is, the porcelain coating performs in this capacity better than a glass coating would.

During normal operation of the plasma ion source antenna, the porcelain coating 22 does not evolve gases or vapors to any substantial extent.

In brief, the antenna is fabricated by the following steps:

Step 1) forming a portion of metal conductor 20 into a coil 12,

Step 2) cleaning the metal conductor base for the antenna,

Step 3) etching the metal conductor base for the antenna,

Step 4) applying a thin coat of porcelain slip 24 to the antenna,

Step 5) optionally wiping porcelain slip from the ends 17 and 18 to create an eletrical contact area, Step 5a) applying a substance to the ends 17 and 18 to prevent metal conductor from scaling during firing, Step 6) firing the coated antenna at a temperature above the melting temperature of the porcelain mixture and below the melting temperature of the metal conductor for a time sufficient to form a porcelain coating 22 that is fused to the metal conductor, Step 7) cooling the fired antenna, Step 8) optionally, brushing unfused porcelain off the ends 17 and 18, Step 9) testing the porcelain coated antenna for electrical current leakage, and Step 10) repeating steps d) through i) until there is no electrical current leakage.

Frequently, three coats of porcelain are fired on to the antenna to make the plasma ion source antenna 10. Sometimes one or two layers of quartz sleeving are added over the porcelain coated antenna.

Figure 4:
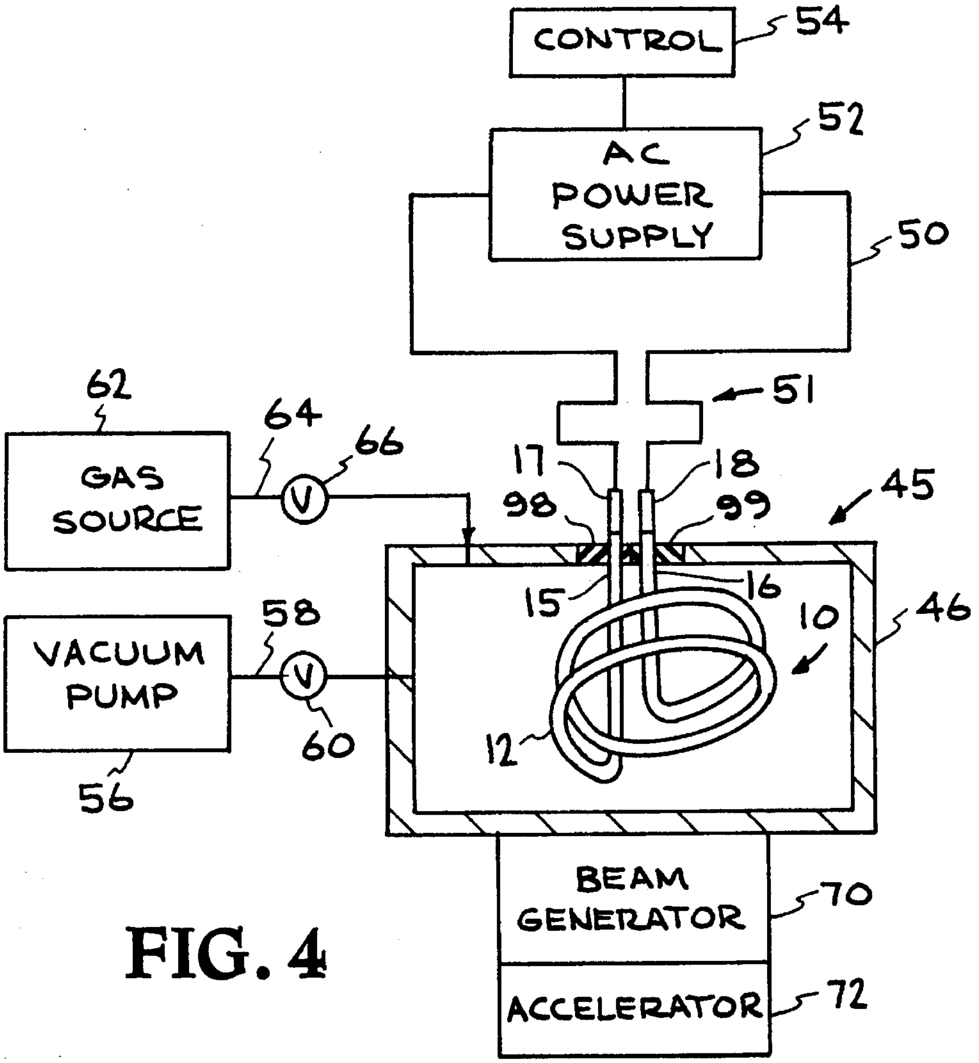
FIG. 4 is a schematic illustration of the plasma ion source antenna as used to produce a high density plasma in a volume ion source. The antenna can be used in a surface conversion ion source or other types of ion sources as well.
Figure 7:
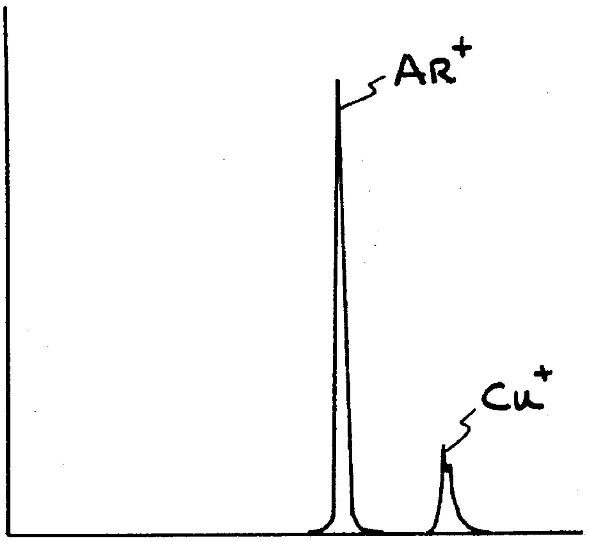
FIG. 7 is a is a graph showing the percent of $Cu^+$ ions relative to $Ar^+$ ions in an extracted beam.

FIG. 4 is a schematic illustration of the finished plasma ion source antenna 10, installed in a volume plasma ion source 45, having a vacuum chamber or housing 46 within which the antenna 10 is mounted. The plasma ion source antenna can also be used in a surface conversion ion source. The lead-ins 15 and 16 extend out of the vacuum chamber 46 through seals 98 and 99. The terminals or contacts 17 and 18 are connected into an AC power supply circuit 50 through an impedance matching circuit 51 and including an AC power supply 52. The power supply 52 may have a control 54 for regulating the power supplied to the antenna. The power supply 52 may include an amplifier which supplies power at a suitable frequency. Frequently the frequency may be in the range of one to two megahertz, but is not so limited. For example, the lower limit of usable frequencies is where the period of oscillation equals the ionization time. This occurs in the range of about 500 kHz. At lower frequencies, oscillations of the plasma density will become significant. This will affect the ion beam optics. However when the system is not used for ion beam applications but instead is used, for example, for ion implantation, frequencies lower than 500 kHz may be acceptable. The upper range is in the tens or hundreds of megahertz, although special electronics, such as use of waveguides rather than co-axial cables, would need to be used for frequencies approaching a hundred MHz or higher.

Generally, the plasma ion source 45 includes means within the vacuum chamber 46 for producing initial ionization. Such means may take the form of a small electron-emitting filament, for example. The power supplied by the plasma ion source antenna 10 then greatly builds up the level of ionization and produces a dense ion plasma within the vacuum chamber 46 from which ions can be extracted to generate an ion beam.

In FIG. 4, a vacuum pump 56 is connected to the vacuum chamber 46 by a vacuum line 58 which includes a regulating valve 60. The vacuum pump 56 is operative to establish and maintain an appropriate vacuum level in the chamber 46. FIG. 4 also shows a plasma gas source 62, connected to the vacuum chamber 46, by a supply line 64 which includes a regulating valve 66. The gas source 62 may be a pressure tank containing the desired plasma gas, such as hydrogen, deuterium, nitrogen, or others, to be ionized in the vacuum chamber 46, so as to produce the desired high density plasma.

As schematically shown in FIG. 4, the plasma ion source 45 may provide a copious supply of ions to a beam generator 70 which may inject a beam into an accelerator 72. The beam generator 70 may generate a neutral beam, or a beam of particles which are either positively or negatively charged.

EXAMPLES

This invention will be further described by the following Examples. The Examples are not to be construed as limiting the scope of this invention, which is further defined by the appended claims.

Example 1

Production/Fabrication of Metal Conductor Portion

The conductor portion of the antenna was fabricated from electrically conducting metal wire or tubing. Depending on the size and strength requirements of the antenna, the metal may be copper, aluminum, copper-coated stainless steel, or other materials. Under operating conditions where heating was not a problem, the metal portion of the antenna was formed from solid metal. For example, in an experiment where a high flux of relatively low energy argon ions was needed, an antenna was successfully made from solid 0.062 inch copper wire. The copper wire was taken from a roll of tin coated hookup wire. The tin was stripped from the wire by immersion in concentrated nitric acid after which it was rinsed and cleaned in chromic acid based Bright Dip, (available from Lewisan Lord Chemical Co., P.O. Box 1013 Burlingame Calif.; telephone number 415 375-1880). Other acid cleaning agents also work as may a hot soap cleaning agent. The wire was shaped similarly to that depicted in FIG. 1. The coil portion of the antenna had an outside diameter of 0.89 inches and was made into 2.33 helical turns with 0.175 inches spacing between the turns. Porcelain was applied as described below to a thickness varying between 0.004 inches and 0.008 inches. This antenna was operated in a one inch diameter volume ion source containing argon gas. The power level varied between 3 kilowatt (kW) and 6.5 kW. The pulse time was 1 millisecond (msec.). The frequency was about 10 Hz.

When the duty cycle and power level or other operating conditions created (or were thought might create) a heating problem, the antenna was preferably built from hollow tubing so that water or other coolant could be circulated through the antenna during operation. Because of convenience and availability, two types of copper tubing used were 0.188 inch copper refrigerator tubing and 0.25 inch copper refrigerator tubing. It will be obvious to those skilled in the art that many other types of conductive tubing or wire can be chosen for this function.

Depending on the application, factors such as tubing diameter, coil diameter, distance between coil turns (coil turn spacing), number of turns, thickness of porcelain coating, possible additional use of quartz or glass coatings or sleevings, and angle of the end portions, will vary in a manner that can be determined by trial and error in a fashion that will be obvious to workers of ordinary skill in the art. For example, if too many or too few turns were used for a particular application or for a particular set of operating conditions, the extracted ion beam current decreased from optimum. Thus for each new application some experimentation was required to determine the optimum number of turns. Similarly, if the porcelain coating was too thin, breakdown of the electrical insulation occurred, or if it was too thick, the plasma did not strike up.

The table below shows examples of some coil configurations and operating conditions that have worked in our laboratory: All measurements are approximate.

| COIL DESCRIPTION | METAL CONDUCTOR | COATING | OPERATING CONDITIONS | ION SOURCE | PLASMA/ IONS |
|---|---|---|---|---|---|
| 9 inch (") nominal outside diameter (o/d); One turn. | 0.25" copper (Cu) refrig. tubing | Porcelain | 15 kW pulsed; 35 sec pulse; ≦80% duty cycle | Barium Surface Conversion source (BaSCS) | $D_2/D^-$ |
| 9" nominal o/d; One turn. | 0.25" Cu refrig. tubing | Porcelain covered by 1 layer of quartz sleeving | 16 kW pulsed; 45 sec. pulse; ≦90% duty cycle | BaSCS | $D_2/D^-$ |
| 8" nominal o/d; One turn. | 0.25" Cu refrig. tubing | Porcelain covered by 1 layer of quartz and 1 layer of glass sleeving | 30 kW pulsed; 5 sec. pulse; ≦15% duty cycle | BaSCS | $D_2/D^-$ |
| 2.75" nominal o/d; Two turns; 0.5" between turns | 0.188" Cu refrig. tubing | Porcelain | 5.5 kW Continuous Wave (CW) | 10 cm diam. volume source | $N_2/N^+$ $H_2/H^-$ |
| 2.75" nominal o/d; Two turns; 0.5" between turns | 0.188" Cu refrig. tubing | Porcelain covered by two layers of quartz sleeving | 18 to 22 kW pulsed; ≦1.25 sec pulse; ≦1 pulse/30 sec. | 10 cm diam. volume source | $H_2/H^-$ |
| 2.75" nominal o/d; Two turns; 0.5" between turns | 0.188" Cu refrig. tubing | Porcelain | 33 kW pulsed; ≦170 msec pulse; ≦1 pulse/30 sec. | 10 cm diam. volume source | $H_2/H^-$ |
| 2.75" nominal o/d; Two turns; 0.5" between turns | 0.188" Cu refrig. tubing | Porcelain | 50 kW pulsed; 1 msec pulse ≦10 Hz | 10 cm diam. volume source | Positive ion production from: $N_2$, $O_2$, He, Ne, Ar, Kr, Xe; Negative |

-continued

| COIL DESCRIPTION | METAL CONDUCTOR | COATING | OPERATING CONDITIONS | ION SOURCE | PLASMA/ IONS |
|---|---|---|---|---|---|
| | | | | | ion production from; $H_2$ |
| 2.125" nominal o/d; Two turns; 0.5" between turns | 0.188" Cu refrig. tubing | Porcelain | 6 kW CW; | 3" diam. volume source | $BF_3/B^+$ $CO_2/C^+$ |
| 2.125" nominal o/d; Two turns; 0.5" between turns | 0.188" Cu refrig. tubing | Porcelain | 50 kW pulsed; 1 msec. pulse ≦10 Hz | 3" diam. volume source | $H_2/H^-$ |
| 0.89" nominal o/d; 2-⅓ turns; 0.175" between turns | 0.062" solid Cu; made from tin Cu hook-up wire with tinning removed. | Porcelain | 3 to 6.5 kW; 1 msec. pulse about 10 Hz. | 1" diam. volume source | Positive ion production from Ar gas |

For some ion implantation applications such as for large machinery or automobile engines, coil diameters of 5 feet or larger are used. When the size of the coil becomes too large for the strength of copper-alloy tubing, copper-coated stainless steel or another mechanically stronger configuration is used.

Example 2

Production/Fabrication of Porcelain Coating

The first step in applying the porcelain coating was to clean the metal coil. Cleaning can be accomplished many ways. In one example, the coil was heat treated for approximately one minute using an acetylene or propane torch to remove oils and other substances from the coil surface. Other means of heat treatment will be obvious to workers of ordinary skill in the art. Occasionally the cleaning step was omitted without harming the resulting porcelain coated antenna. Next the coil was etched. Two ways found particularly effective for etching the coil was acid washing and/or sandblasting. Sandblasting was sometimes found to distort the shape of the coil somewhat so acid washing was preferred. There are many formulas for acid washes in general use by people who prepare metal surfaces for subsequent deposition. The one most commonly used in the practice of the present invention is a 7% HCl solution made by mixing 10 ounces of Sparex N&Z Granular Dry Acid Compound to 1 quart of water. After the acid wash, the coil was washed with clean water to remove and neutralize the acid. The coil was then scrubbed with a pad and fine porcelain-powder to remove any oxide that might have formed. Then the clean, etched coil was rinsed and air dried. When it was desirable to speed the drying process, filtered compressed air was used. The coil was now ready for the porcelain to be applied.

A porcelain slip was prepared according to the following formula:

| | |
|---|---|
| 100 lbs. | Neo 1965Y Frit, |
| 40 lbs. | water |
| 5 lbs. | 15020 Frit, |
| 4 lbs. | M-32 Clay |
| 2 lbs. | 0-110 Titania |
| 4 oz. | Bentonite |
| 4 oz. | Potassium Carbonate |
| 1 oz. | Sodium Nitrite |
| 0.5 oz. | Salidiser 210 |
| 5 gm. | Tris Nitro |
| 120 gm. | 20049 Oxide |
| 140 gm. | 20027 Oxide |
| 35 gm. | 12312 Oxide |

Neo 1965Y Frit, M-32 Clay, Salidiser 210, Tris Nitro, 0–110 Titania, 20049 Oxide, 20027 Oxide, and 12312 Oxide are available from Miles Corporation, telephone (714) 833-2351. 15020 Frit is available from Chicago Vitreous Corporation, telephone: (310) 721-5552.

The above ingredients were placed in a conventional ball mill and milled for about three hours or until the porcelain slip was of spraying consistency.

This particular formula was easy to use, gave a pleasing color to the antenna that made the porcelain easy to inspect for cracks, and fired at a temperature and time that was convenient to work with. However many variations of the formula are possible. For example the pigments, 0–110 Titonia, 20049 Oxide, 20027 Oxide, and 12312 Oxide can be changed or omitted with no deleterious effect as the maker finds desirable. The amounts of other ingredients can be altered by plus or minus 20%. Frits of similar quality can be substituted for the Neo1965Y and 15020 Frits. To make a more elastic enamel coating, frits with a lower firing temperature can be used. Alternate types of salidiser can be used. The relative proportions of Bentonite and clay, which provide bisque strength, potassium carbonate and sodium aluminate which control the set and viscosity, and sodium nitrate which provides strength, can be varied in a way that will be obvious to one skilled in the art to provide the desired combination of properties from alternate ingredients or amounts. Tris nitro is a disinfectant that prevents microorganisms from growing in the mixture during storage. Many other disinfectants can also be used. Under some circumstances no disinfectant need be used, for example, if the mixture is not stored very long. A dry powder made from the above formula without the water ingredient will also work and is preferable for some applications.

The pre-fired porcelain mixture, also referred to by those in the art as a porcelain slip, was applied to the prepared metal surface by spraying a thin, uniform, even coat from a variety of angles around the coil. It is best to attempt to spray as thin a coating on the antenna as possible while still achieving uniformity and full coverage. Alternatively the coil can be dipped into the porcelain mixture. It is important that the deposited layer is applied in a thin and uniform layer. After the deposition, the coating was allowed to dry on a gas dryer. Alternatively the coated coil was simply air dried or dried in an infra red or other low temperature oven. The color of the coating changed as the antenna dried and it was possible to see when the coating was entirely dry by inspecting the color of the coating.

Another method of depositing the pre-porcelain mixture is by electrostatic application. A dry pre-porcelain mix is applied to the clean coiled conductor using commercially available electrostatic equipment, for example, from Nordson, 555 Jackson Street, Amherst Ohio 44001. The dry mixture is deposited onto the conductor in a thin uniform coating by electrostatic force.

In order to use the uncoated ends of the coil as contacts for electrical leads, the unfired porcelain powder was wiped off the ends of the metal conductor. The exposed metal conductor was then coated with Scalex (Leslie Ceramic Supply Co., 1212 San Pablo Road, Berkeley, Calif. 94707) to prevent the metal from scaling during firing. After firing, the end contacts were rubbed clean.

The antenna unit was then fired in a furnace at 1400° F. for a time ranging between about one-half minute to about eight minutes. Some components in the porcelain coating burn away with excess time in the furnace. It will be obvious to the worker of ordinary skill that the antenna can be fired for longer times at lower temperatures or for shorter times at higher temperatures. Some trial and error will reveal alternative combinations of times and temperatures that a given porcelain formulation can be left in the furnace without loss of integrity. The right combination of parameters will result in a hard, electrically insulating porcelain layer where the surface is bubble-free after firing. The temperature must be lower than that required to melt the metal and higher than the minimum temperature required to fuse the frit. After the antenna is removed from the furnace and cooled, it was tested in a saltwater solution for electrical integrity. The saltwater solution was typically made by adding approximately 2 cups of salt to one gallon of water in a plastic container. Current is then measured between the coil and the solution using a volt-ohm meter. If measurable current leakage was observed using the 0–40 MΩ and 10–20 KV(ac) scale, another layer of porcelain was applied, dried and fired onto the antenna unit. This was repeated until a tight, electrically insulating, porcelain layer was obtained. Frequently, three coats of porcelain mixture was applied and fired in this manner. The average thickness of the final porcelain layer is preferably between about 0.2 mm and about 0.5 mm thick, although it can vary from approximately 0.01 mm to approximately 5 mm thick inclusively.

Antennas made with the inventive porcelain coating have a long lifetime, as illustrated by the following results. Each measurement represents the diameter of the antenna, plus the additional thickness of the porcelain coating surrounding the antenna, measured at various points along the antenna surface. These measurements were taken before and after the antenna was operated and immersed in a dense Xenon plasma for the amount of time shown.

| Position | New | 1.1 Plashr | 6.79 Plashr | 13.04 Plashr |
|---|---|---|---|---|
| 1 | 5.06 mm | 5.03 mm | 5.06 mm | 5.05 mm |
| 2 | 5.25 mm | 5.19 mm | 5.21 mm | 5.20 mm |
| 3 | 5.20 mm | 5.15 mm | 5.24 mm | 5.24 mm |

-continued

| Position | New | 1.1 Plashr | 6.79 Plashr | 13.04 Plashr |
|---|---|---|---|---|
| 4 | 5.25 mm | 5.23 mm | 5.27 mm | 5.17 mm |
| 5 | 5.08 mm | 5.12 mm | 5.22 mm | 5.05 mm |

"Plashr" refers to a plasma hour, a time equivalent to the operating the antenna continuously, also called continuous wave (cw) operation, in a plasma for one hour. Thus a pulsed plasma running at a 10% duty factor for 10 hours would be equivalent to one plasma hour.

All measurements were accurate to within about 0.1 mm. There was no degradation of the antenna within experimental error. The experimental error was mostly due to small variations in the porcelain thickness due to the coating process and the difficulty in locating the exact measurement positions on the antenna. The first 1.1 plasma hours of operation was actually 11 hours of pulsed operation at a 10% duty factor. The 6.79 plasma hours includes the first 1.1 plasma hours of pulsed operation, an additional 0.167 plasma hours pulsed operation, followed by 5.52 hours of cw operation. The final 13.04 plasma hour measurements included all previous times, plus another 6.21 hours of cw operation. After 6.79 plasma hours of operation, the antenna surface looked unaltered to the naked eye.

Below further examples are provided describing utility of ions created using the inventive porcelain coated antenna.

UTILITY EXAMPLES

Some but not all applications of the porcelain-coated, electrically insulating, non corrosive, antenna are illustrated below.

Example 3

Ion Sources

The inventive porcelain coated antenna was operated in both continuous and pulsed mode in a multicusp volume source. When operated in a low density gas, the RF-driven inventive antenna, couples from 1 to 100 kilowatts power to the gas, thus creating a plasma useful to generate negative or positive ion beams. The inventive antenna is particularly useful to generate high-current negative or positive ion beams. For inert gas plasmas such as He, Ne, Ar, Kr and Xe, the extractable current density was up to several Amps/cm$^2$. The extracted beam contained almost pure atomic ions, even when diatomic gases such as $H_2$, $N_2$, and $O_2$ were used for the discharge. Thus, simple accelerator or plasma processing systems were constructed without the use of mass analyzing magnets. A 40 mA negative hydrogen ion ($H^-$) beam was obtained from a plasma created from $H_2$ gas using the inventive antenna. Among other uses, these beams are useful for fusion applications; $He^+$ is further useful as a fusion diagnostic beam. The beams are useful for medical applications. A similar source using the inventive porcelain-coated antenna has also been used to produce steady-state beams of metallic ions.

Example 4

Accelerators

The volume source chamber used in this example was a copper cylinder (10 cm diameter by 10 cm long) surrounded by 20 columns of samarium-cobalt magnets that form a longitudinal line cusp configuration, as described in U.S.

Pat. No. 4,486,665, Negative Ion Source, by Leung and Ehlers. The magnets were enclosed by an anodized aluminum cylinder with cooling water circulating between the magnets and the inner housing. The back flange had four rows of magnets cooled by drilled water passages in the copper.

It has been demonstrated that atomic hydrogen species as high as 85% can be obtained routinely if a multicusp source is operated with a magnetic filter. The magnetic field generated by the filter magnets is strong enough to prevent the primary electrons from reaching the extraction region. The absence of energetic electrons will prevent the formation of $H_2^+$ in the extraction region and thus enhance the atomic ion species percentage in the extracted beam.

In order to enhance the $H^-$ yield, a pair of water-cooled permanent magnet filter rods was installed near the extraction region. The filter rods provided a narrow region of transverse magnetic field which divided the entire source chamber into a discharge and extraction region. The filter field was strong enough to prevent energetic electrons from reaching the extraction region. Excitation and ionization of the gas molecules took place in the discharge chamber. Positive and negative ions, together with cold electrons were present in the extraction region, and they formed a plasma with lower electron temperature which is favorable for the generation of $H^-$ and atomic positive ions such as $H^+$, $N^+$ and $O^+$.

The hydrogen ion species composition in the RF driven source has also been investigated. With the filter in place, the $H^+$ ion concentration is greater than 97% for an RF input power of 30 kW. The highest current density achieved is about 1.5 A/cm$^2$.

The open end of the source chamber was closed by a two-electrode extraction system. Positive or negative ion beams were normally extracted from the source through a 2-mm-diameter aperture. A permanent-magnet mass analyzer was used with a Faraday cup to measure the electron, $H^-$ ion, or positive ion currents in the accelerated beam. When multiple ion species were present, an electromagnetic mass analyzer was used to determine the species distribution.

The inventive porcelain-coated antenna was driven by an RF signal, generated by a digital synthesizer. In one example, a signal of about 2 MHz was sent to a preamplifier, and then to the main power amplifier. The RF power output of the main amplifier can be controlled by changing the amplitude and frequency of the synthesizer signal. Using this set-up, maximum efficiency was achieved when the output voltage and current of the main RF amplifier were in phase and operating at a 50 ohm impedance. Peak performance allowed an average RF output power of 50 kW in pulsed and 6 kW in continuous wave (cw) operations.

The RF power traveled through a 50 ohm coaxial cable to the isolation transformer and matching network, and antenna. The matching network matches the 50 ohm impedance of the amplifier to the impedance of the antenna coil immersed in the plasma. A small, negatively biased tungsten filament was used to aid in starting the plasma. Once the plasma was initiated, it was self sustaining in cw operation and the filament was turned off. A plasma was initiated without a filament when there was a high source gas pressure (more than about 50 mTorr). Once the plasma was formed, the pressure was adjusted back to the normal operating range.

Example 5

$H^-$ Ion Production for the Supercollider Super Conductor; Diatomic Gasses

Multicusp plasma generators have been operated successfully as volume production $H^-$ sources. The $H^-$ ions formed by volume processes have low beam emittance and therefore are useful for the generation of high-brightness beams. In order to achieve high current densities, volume $H^-$ sources require high discharge power. As a result, the lifetime of the ordinary filament cathodes is short for steady state or high repetition rate pulsed operations.

An RF driven $H^-$ source has been developed at Lawrence Berkeley Laboratory for use in the Superconducting Supercollider (SSC). Operation of this RF driven multicusp $H^-$ ion source with the glass-coated antenna has been previously reported (K. N. Leung, et al., Rev. Sci. Instrum, v 62, p.100, Jan 1991). However the glass-coated antenna failed too frequently due to its mechanical fragility and limited electrical insulation capability. The inventive, long-lasting, electrically insulating, porcelain coated antenna performs much better in this environment than the glass coated antenna did. Recently, the filter and the collar geometries were also optimized to obtain higher $H^-$ output and lower electron current in the extracted beam, (U.S. patent application Ser. No. 07/875,778, A Negative Ion Beam Injection Apparatus). Using the inventive porcelain coated antenna, an $H^-$ current of about 40 mA can be obtained from a 5.6-mm aperture with the source operated at a pressure of about 12 mTorr and with 50 kW of RF power. The ratio of electrons to $H^-$ ions in the extracted beam varies from 8 to 12 as the RF power is changed from 20 to 50 kW. Using these experimental results along with previous emittance measurements (G. Gammel, et al., Proc. of 1991 Particle Accelerator Conference, May 1991, San Francisco, Calif., p. 2023) a simple four-electrode electrostatic injector system has been designed for the Supercollider Superconductor Radio Frequency Quadrapole (K. N. Leung et al., Proc of the XVth Int. Conf. on High Energy Accelerators, Hamburg, Germany, Jy 1992) incorporated herein by reference, that uses the inventive, long-lasting, porcelain coated antenna in a volume ion source as described above.

Example 6

Accelerators, Inert Gases

Figure 5:
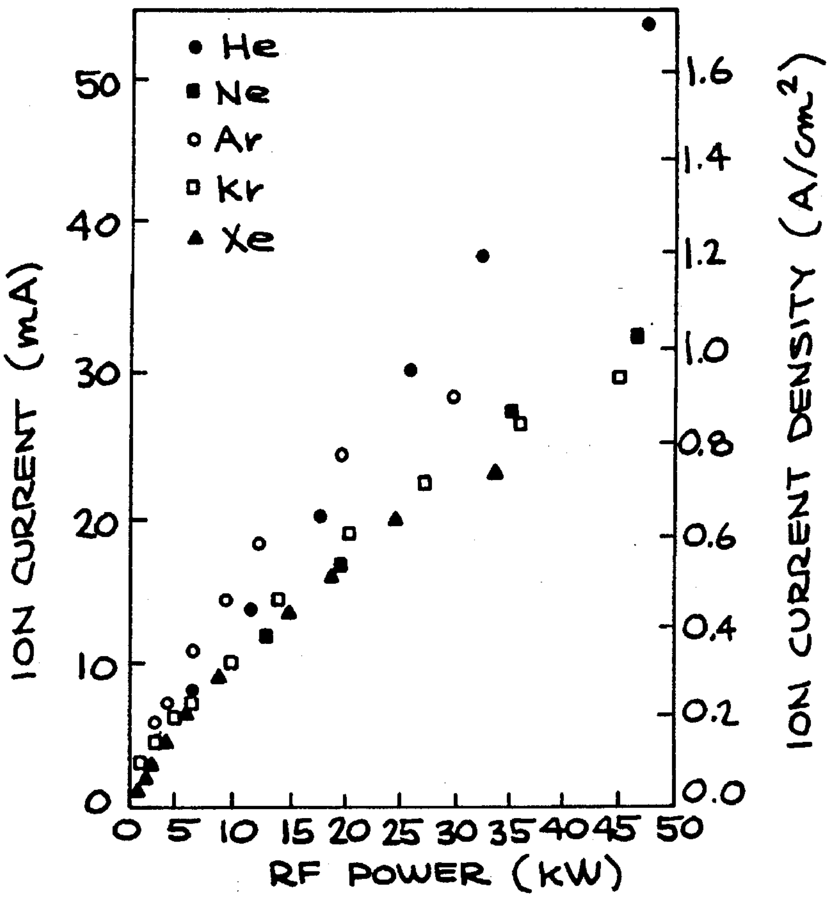
FIG. 5 a is a graph showing the relationship of ion current to radio frequency (RF) power in kilowatts. It also shows the relationship of ion current density to radio frequency (RF) power in kilowatts. Data is shown for He, Ne Ar, Kr, and Xe.

The same RF multicusp source has also been tested using the inventive antenna with inert gas plasmas such as He, Ne, Ar, Kr, and Xe. In these measurements, the filter rods are removed and the first electrode is left floating electrically. FIG. 5 shows the resulting extractable positive ion current (and current density) as a function of RF power. The optimum source pressure is typically below 1 mTorr. It can be seen that the output currents increase linearly with RF input power. In most cases, the extractable ion current density was as high as about 1 A/cm$^2$ at approximately 50 kW of RF input power. When the beam emittance is small, this RF driven ion source is extremely useful for projection ion beam lithography and ion beam machining applications.

Example 7

Ion Implantation, Diatomic Gasses Other Than $H_2$ Nitrogen Ion—$N_2$

Nitrogen ion implantation increases the surface hardness and wear resistance of metals. Deep implants are always preferred, and for this reason $N^+$ ions are more desirable than $N_2^+$ ions. If there is a high concentration of $N^+$ ions in the extracted beam, then the usual mass separation process needed to remove the molecular ions can be avoided. Similar to the hydrogen discharge, the atomic ion concentration increases with the RF input power. A nearly pure (>98%) $N^+$ ion beam with current densities in excess of 500 mA/cm$^2$ has been obtained when the inventive, clean-operating, hard porcelain enamel coated antenna and the magnetic filter were employed.

Example 8

Ion Implantation, Diatomic Gasses, $O_2$, Oxygen

The inventive, clean-operating, hard porcelain coated antenna has also been operated in a volume ion source using other diatomic gases such as oxygen.

Figure 6:
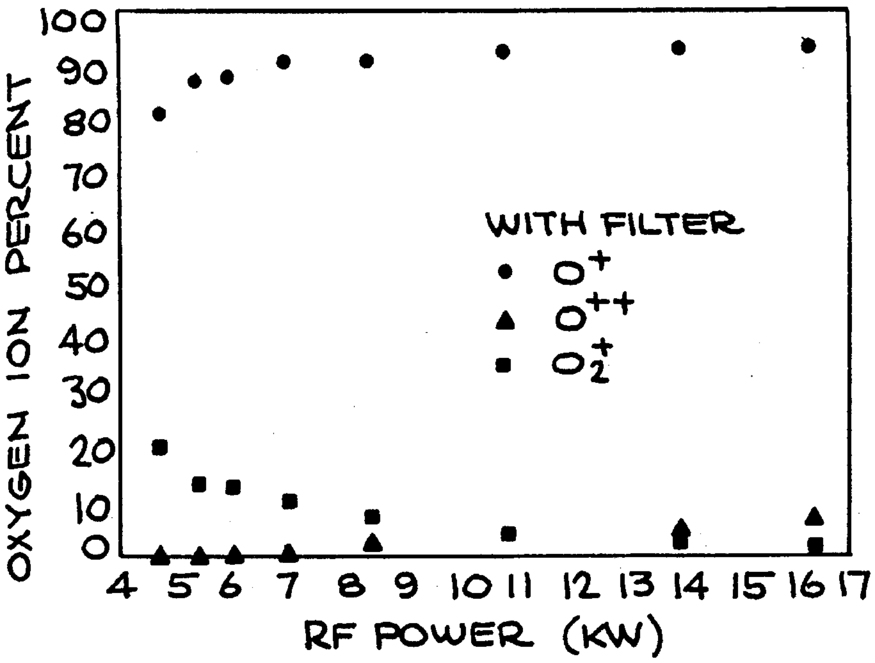
FIG. 6 is a graph showing the relationship of oxygen ion purity in the extracted beam relative to the RF power in kW for different species of oxygen ion.

Oxygen implantation is important for creating electrically insulating layers. In addition to $H_2$ and $N_2$, Oxygen plasmas are usually produced by either RF or microwave discharges. It is difficult to use a dc discharge with tungsten filaments because electron emission deteriorates rapidly when oxygen is present. The porcelain coated antenna has been operated very successfully with an oxygen plasma both in pulsed and cw modes. FIG. 6 shows a plot of the oxygen ion species as a function of RF power. An atomic ion concentration higher than 93% can be achieved with approximately 16 kW of RF power. The extractable ion current density is greater than 500 mA/cm$^2$.

The above results demonstrate that a simple and more compact oxygen implanter can be designed with the use of a magnetically filtered RF driven multicusp source. In particular, this type of source should be very useful for SIMOX (Separation by Implantation of Oxygen) technology. The word "separation" in the SIMOX acronym refers to electrical separation of silicon oxide pacification layer created when oxygen is implanted into the surface of silicon. Using the inventive antenna, almost pure $O^+$ ions can be produced providing a much higher current density than conventional sources and thus reduces the time required to form a buried silicon oxide layer.

Example 9

Ion Implantation, Metals and Noble Gases

Generation of ions for implantation of surfaces is an important commercial application of the clean-operating, hard, electrically insulating, porcelain-enamel-coated, noncorrosive inventive antenna. Metallic ions are commonly used in implantation and thin film deposition processes. The RF driven, inventive, clean-operating, hard, electrically insulating, porcelain coated antenna has been used to create ions for deposition and implantation onto surfaces.

A variety of ions have been generated from metal vapor, compound gases, or by sputtering. Bismuth is an example of ions created from metal vapor; Uranium Fluoride is an example of a compound gas from which Uranium ions were created using the inventive porcelain coated antenna. Other gases that can be used include, but are not limited to, argon, helium, xenon, krypton, neon, hydrogen, nitrogen, oxygen, boron trifluoride, uranium fluoride, and other metal fluorides. Vapor or gas was introduced to the vacuum chamber 46 of the plasma ion source 45. As previously descibed, RF power was coupled to the gas via the inventive antenna to form a plasma. Ions were extracted via the beam generator 70.

Additionally, metallic ions can be created with the inventive antenna using the sputtering technique. For example, neutral copper is sputtered from a target by background argon ions. The copper atoms are subsequently ionized by the plasma electrons. Other metallic ions, including but not limited to gold, platinum, nickel, carbon, or chromium, are generated in a similar manner. Additionally, mixed metallic ion compositions can be generated from a target made of the desired proportions of mixed materials. Ions are implanted into the surface of conductors or non conductors using appropriate parameters such as voltages, pulse times, waveforms, or continuous wave operation. As a result, use of the RF driven, inventive, clean-operating, hard, electrically insulating, porcelain coated antenna in a ion source opens new doors to a wide range of applications. If the porcelain antenna becomes fouled with the metal ions in the plasma chamber, it is cleaned by rinsing in any of many commonly known agents. One example of a cleaning agent that will strip tungsten depositions from the porcelain coated antenna is common Clorox® bleach.

Some further illustrative examples are described below. These examples are not at all exhaustive of the use of the inventive porcelain-coated antenna for ion implantation.

Example 9A

The clean-operating, hard, electrically insulating, porcelain-enamel-coated, noncorrosive inventive antenna was used to generate $B^+$ ion beams for ion implantation systems, starting with the highly corrosive $BF_3$ gas.

Example 9B

One valuable new application is mixing metal ions from other sources (such as sputtered, evaporated, or vacuum arc discharge) with plasma ions formed from metal gases for deposition and or implantation to chemically modify surfaces.

The inventive porcelain-enamel-coated antenna will generate plasma ions useful for modifying surfaces of high-field RF components by mixing metal ions from other sources with plasma ions formed from metal gases.

One of the problems encountered in many high-power RF systems is multipactoring inside vacuum RF cavities. A Titanium Nitride coating formed by evaporating Titanium (Ti) in the presence of ammonia gas ($NH_3$) can greatly reduce the multipactoring (W. D. Cornelius and R. J. Grieggs, Los Alamos National Laboratory Report No.LA-UR-84-2489), but evaporation methodology has some drawbacks: It does not form an even TiN coating on all surface areas, it is time consuming to perform, and the bonding of the TiN to the RF surface is not optimized. Combining a metal ion source (such as sputtered, evaporated, or vacuum arc discharge) with plasma ions formed from metal gases using the RF-driven porcelain coated, noncorrosive, inventive antenna together perform the titanium-nitriding process on RF components better than evaporation. The titanium plasma is generated using any of a number of means, such as sputtered, evaporated, or vacuum arc discharge. For example a vacuum arc, where one of the electrodes is titanium, is well suited for production of a titanium plasma. The nitrogen plasma is generated by coupling RF power to a nitrogen gas via the inventive RF-driven porcelain-enamel-coated antenna. Both titanium and atomic nitrogen ions ($N^+$) are produced and implanted into the RF components surfaces to form a TiN coating. The ion implant energy can be optimized by one of ordinary skill in the art to achieve the best TiN coverage and bonding. Since the entire RF component is immersed in the TiN plasma, the TiN coating can be formed on all surface areas. To prevent the metal vapor from fouling the antenna, one or more porcelain coated antennas are located at a distance from the vacuum arc source. The implantation process is used with a relatively low bias voltage applied to the target of approximately a couple of hundred volts. As the implant ion dose rate is high, a shorter processing time is needed for titanium nitriding an RF component using plasma implantation than using the evaporation process (*Development of a Large Plasma System for Surface Modification of High Field RF Components*, Draft proposal submitted to the Superconducting Super Collider Laboratory by Ka-Ngo Leung, Ian Brown, and William S. Cooper), incorporated herein by reference.

Example 9C

The clean-operating, hard, electrically insulating, porcelain coated, noncorrosive, inventive antenna is useful for generating ions that harden large surfaces and reduce their susceptibility to corrosion when the ions are implanted into the surfaces. One important example is automobile engines. Implanting $N^+$ into automobile engines and engine parts renders them longer lasting because the surface becomes harder and more resistant to corrosion and/or wear. Until the invention of the above described clean-operating, hard, electrically insulating, porcelain coated, noncorrosive, inventive antenna, no methodology existed for efficient implanting of ions into a large, irregularly shaped metallic object like a vehicle engine.

A patent issued to John R. Conrad (U.S. Pat. No. 4,764,394) describes ion implantation to a target object immersed in a plasma. Conrad applied repetitive pulses of high voltage between the chamber walls and the target object. Positive ions in the plasma were drawn to the target object at a voltage sufficient to implant the ions into the target.

Conrad's technology has several limitations or drawbacks. First, due to finite rise time of the applied voltage, the implanted ions have a spread of energy and therefore a broad implant profile. This is a particular disadvantage in the case of oxygen ion implantation. Second, if the object is large and the current drawn by the object is high, then fabrication of the electronic switch becomes complicated. Third, since in Conrad's work, the source plasma is switched on all the time (while the voltage on the target is pulsed), heat loading, due to radiation heating, can be high enough to create difficulties.

A plasma ion source that uses the clean-operating, hard, electrically insulating, porcelain coated, noncorrosive, inventive RF-driven antenna circumvents the problems associated with Conrad's ion implantation system. The present porcelain-enamel-coated RF antenna is pulsed and the target is held at constant voltage. The pulsed source creates less radiation heat than that associated with Conrad's constantly "on" plasma source, and the constant bias on the target results in an narrow implant profile. At voltages lower than 1 kV the plasma source can be operated in a steady state or cw mode.

The plasma volume source using the present inventive antenna is surrounded by permanent magnet columns which can provide confinement to the plasma. The target object can be large or small. It is placed inside the chamber and is biased with a dc voltage. The bias voltage is determined by the needs of the specific application. The plasma is generated by an RF induction discharge via the hard, electrically insulating, porcelain coated, noncorrosive, inventive antenna. A sine-wave oscillator drives a gated solid state amplifier at a nominal operating frequency of about 2 MHz. The resulting RF pulses drive a Class C tube amplifier. Both the pulse width and the repetition rate are adjustable. In order to couple the RF power efficiently into the source plasma, an impedance matching network (which is a tunable resonant parallel LC circuit) is used.

If the bias voltage (or ion implant energy) on the target object is low (less than 1 kV), a cw plasma can be employed. However, if the bias voltage on the target object is high (>1 kV), then voltage breakdown can occur easily between the target object and the chamber in the presence of a plasma. However, this problem can be circumvented if the plasma discharge occurs over only a very short period of time. Pulsing the plasma discharge over short time periods has been easily obtained using the inventive RF-driven antenna to induce the plasma. Because the plasma produced using the hard, electrically insulating, porcelain coated, noncorrosive, RF-driven inventive antenna is clean and produces no cathode material such as tungsten, the level of impurity ions that are undesirably implanted into the target object is much reduced. Since the pulse length as well as the repetition rate can be varied easily, one can control the implant ion dose rate and the target temperature. A high voltage and/or high current electronic switch can be avoided. Nitrogen and Oxygen ion implantation by this method is especially important to the automobile, tool, and semiconductor industry.

Example 10

Waste Disposal: Treatment of Chemical or Radioactive Waste

Low power plasma torches have been used for the treatment of chemical waste and it was recently reported (*R & D International Magazine of Research and Development*, p.50 Dec. 1991) that a 1550° C., 800 kW plasma torch could reduce the volume of low-level radioactive wastes.

The clean-operating, hard, electrically insulating, porcelain coated, noncorrosive inventive antenna can be used to couple high RF power into large volume plasmas to dissociate, ionize, and separate the radioactive components from the non-radioactive parts of the waste (*Development of a High Density Plasma Torch to Reduce the Volume of Radioactive Waste*, a draft proposal submitted to the DOE Mixed Waste Integrated Program by Ka-Ngo Leung, and William S. Cooper), incorporated herein by reference.

Solid waste is prepared by shredding, drying, and sorting stages. Various pre-sorted combinations are then injected into the multicusp chamber, for example, as a fine powder. Liquid waste is injected as is. A background high density plasma (such as nitrogen with density on the order of $10^{14}/cm^3$) is first generated by a 2 MHz induction discharge. As the radioactive waste enters into the hot (about 55,000° C.) and intense plasma, it is completely vaporized. Dissociation and subsequent ionization processes take place inside the core plasma volume. The overall efficiency of the system partly depends on the efficiency of generating the plasma. In the LBL ion source, using the inventive porcelain coated antenna, excellent matching conditions are achieved so that only a very small amount of RF power is reflected back to the generator. In addition, more than 95% of the forward power is absorbed into the plasma. This condition is easily achieved in heavy-mass gases such as nitrogen, argon and xenon. The permanent magnet generated multicusp fields confine and keep the plasma from escaping to the chamber walls, thus enhancing the plasma density.

Example 11

Neutral Beam Systems

Heating a plasma to thermonuclear temperatures is one of the many significant challenges in fusion-energy research. The worldwide magnetic-confinement fusion program includes a proposal to build an International Thermonuclear Experimental Reactor (ITER). The goals of this magnetic-confinement fusion program include ignition of the plasma and self-sustaining burn for as long as two weeks at a time. A prototype neutral-beam injection system for ITER capable of accommodating a 1.3 MeV negative-ion system at currents of about 1 Amp or more was designed using the inventive porcelain coated antenna.

The Common Long-Pulse Source (CLPS) has been used for fusion facilities like the Tokamak Fusion Test Reactor at Princeton and the Doublet-III tokamak at General Atomics. Neutral beams are necessary for fusion and producing them from a positive ion beam as the CLPS does, has fundamental limitations. Energy is limited to about a few hundred keV (120 keV for the Princeton Tokamak) because neutralization is effected through electron capture and as the positive-ion beam increases in energy, the increasing probability of restripping an electron to create a negative ion state dominates neutralization through electron capture.

Using the inventive porcelain coated antenna, a negative ion beam can be efficiently created, accelerated to the necessary energy and subsequently neutralized by the simple process of detaching the extra electron. In contrast to systems based on positive ions, the neutral particle yield from negative ion beams does not decrease with increasing energy. Ion sources made with the inventive porcelain-coated antenna are unique in creating suitable sources of negative hydrogen ions at approximately the ampere or multiampere level.

Use of the inventive porcelain coated antenna for a high frequency RF (for example approximately 1.7 MHz) offers a different and potentially more robust approach to generating the plasma in both volume production and surface conversion sources. The inventive RF-driven, porcelain coated antenna uses the same principle of a "bucket" with a multicusp magnetic field as the thermionic-cathode ion source. The inventive RF-driven, porcelain coated antenna however replaces the filament or cathode. The antenna is immersed in the plasma instead of external to the discharge chamber as in some designs. The antenna's long-term survivability in the plasma has been demonstrated; the porcelain-coated antenna can maintain a clean plasma in continuous operation or a week or more. This is an attractive feature in high power, steady state applications. The RF energy sets up an oscillating magnetic field which in turn produces an electric field.

The description of illustrative embodiments and best modes of the present invention is not intended to limit the scope of the invention. Various modifications, alternative constructions and equivalents may be employed without departing from the true spirit and scope of the appended claims.

We claim:

1. An antenna comprising, a) a metal conductor;

b) a porcelain coating fused to said conductor;

c) electrical contacts for connecting said antenna to an impedance-matched power supply, and d) an alternating-current impedance-matched power supply.

2. The antenna of claim 1 wherein the metal is selected from the group consisting of copper, aluminum, copper-coated stainless steel, steel, and stainless steel.

3. The antenna of claim 1 wherein the conductor is circular or ellipsoidal in cross-section.

4. The antenna of claim 3 wherein the conductor is solid.

5. The antenna of claim 3 wherein the conductor is tubular.

6. The antenna of claim 5 wherein said tubular conductor contains coolant.

7. The antenna of claim 6 wherein the coolant is water.

8. The antenna of claim 3 wherein the tube is between about 0.01 inches and about 1.0 inches in diameter.

9. The antenna of claim 8 wherein the tube is between about 0.1 inches and about 0.3 inches in diameter.

10. The antenna of claim 1 wherein the conductor is in the form of a coil.

11. The antenna of claim 10 wherein the coil is in the form of a helix.

12. The antenna of claim 1 wherein said porcelain coating is formed from a porcelain slip comprising, a) frit;

b) water;

c) clay;

d) setting agent;

e) bisque strength agent;

f) mixture suspension agent;

g) optionally, viscosity agent;

h) optionally, disinfectant;

i) optionally, pigment.

13. The antenna of claim 12 wherein the setting agent is selected from the group consisting of Potassium Chloride, Magnesium Carbonate, Sodium Aluminate, Potassium Carbonate, and Potassium Nitrite.

14. The antenna of claim 12 wherein the bisque strength agent is selected from the group consisting of Benotite, Sodium Nitrite, Arabic Gum, Tragacanth Gum, and Keltex Gum.

15. The antenna of claim 12 wherein the viscosity agent is selected from the group consisting of Sodium Aluminate, Potassium Carbonate, Potassium Nitrite, Potassium Chloride, and Magnesium Carbonate.

16. The antenna of claim 12 wherein the suspension agent is Salidiser.

17. The antenna of claim 12 wherein said porcelain coating is formed from a slip comprising, a) between about 50 and about 80 parts by weight titanium opacified frit;

b) optionally, between about 2 and about 4 parts by weight frit with a higher gloss and higher strength than the titanium opacified frit;

c) between about 2.0 and about 3.2 parts by weight clay;

d) between about 0.1 and about 0.3 parts by weight setting agent;

e) between about 0.2 and about 0.45 parts by weight bisque strength agent;

f) between about 0.0164 and about 0.0246 parts by weight mixture suspension agent;

g) between about 0.0 and about 35 parts by weight water;

h) between about 0.0 and about 0.05 parts by weight viscosity agent;

i) optionally, about between about 0.0 and about 0.01 parts by weight disinfectant j) optionally, about between about 0.0 and about 4.0 parts by weight pigment.

18. The antenna of claim 17 wherein said porcelain coating is formed from a slip comprising, a) between about 59 and about 73 parts by weight titanium opacified frit;

b) optionally, between about 2.9 and about 3.6 parts by weight frit with a higher gloss and higher strength than the titanium opacified frit;

c) between about 2.3 and about 2.9 parts by weight clay;

d) between about 0.147 and about 0.180 parts by weight setting agent;

e) between about 0.29 and about 0.36 parts by weight bisque strength agent;

f) between about 0.0184 and about 0.0226 parts by weight mixture suspension agent;

g) between about 23.6 and about 28.3 parts by weight water;

h) between about 0.03 and about 0.04 parts by weight viscosity agent;

i) optionally, between about 0.006 and about 0.008 parts by weight disinfectant;

j) optionally, between about 1.0 and about 2.0 parts by weight pigment.

19. The antenna of claim 1 wherein the porcelain coating is between about 0.0001 inches and about 0.3 inches thick.

20. The antenna of claim 19 wherein the porcelain coating is between about 0.0005 inches and about 0.15 inches thick.

21. The antenna of claim 20 wherein the porcelain coating is between about 0.001 inches and about 0.05 inches thick.

22. The antenna of claim 1 wherein the ends of the metal conductor are uncoated with porcelain.

23. The antenna of claim 22 wherein the uncoated metal ends comprise electrical contacts.

24. The antenna of claim 1 wherein the power supply is radio frequency.

* * * * *